United States Patent [19]

Finney

[11] 3,750,805
[45] Aug. 7, 1973

[54] BOAT LOADING AND LAUNCHING TRAILER AND METHOD OF LOADING A BOAT THEREON

[75] Inventor: Kelly D. Finney, Chico, Calif.

[73] Assignee: Louis G. Chrysler, Jr., Chico, Calif.; a part interest

[22] Filed: Apr. 23, 1971

[21] Appl. No.: 136,828

[52] U.S. Cl. ................................ 214/84, 280/414
[51] Int. Cl. ............................................. B60p 3/10
[58] Field of Search ..................... 214/505, 506, 84; 280/414

[56] References Cited
UNITED STATES PATENTS

| | | | |
|---|---|---|---|
| 3,009,589 | 11/1961 | Martz | 214/84 |
| 2,763,384 | 9/1956 | Foster | 214/84 |
| 3,067,892 | 12/1962 | Barrett et al. | 214/506 |
| 3,127,041 | 3/1964 | Flynn et al. | 214/505 |

Primary Examiner—Albert J. Makay
Attorney—Flehr, Hohbach, Test, Albritton & Herbert

[57] ABSTRACT

A trailer for transporting a boat, and a method utilizing the motive power of the boat to effect loading thereof on the trailer when the trailer is positioned in the body of water in which the boat is afloat. The trailer comprises a track structure having a dolly movable thereon. Catch structure engageable by a hook member on the bow of the boat is provided to secure the boat to the dolly. When the boat and dolly are interengaged, the motive power of the boat is activated to drive the dolly and the boat therewith longitudinally of the trailer. Guide structure is provided in conjunction with the catch structure to facilitate automatic interengagement of the hook member on the boat with the catch structure on the dolly. Latching means is provided between the dolly and the track structure for automatically locking the dolly adjacent one end of the trailer. Roller means are provided on the trailer for supporting the boat during the loading operation.

9 Claims, 6 Drawing Figures

PATENTED AUG 7 1973

INVENTOR.
KELLY D. FINNEY

BY
Flehr, Hohbach, Test,
Albritton & Herbert
ATTORNEYS

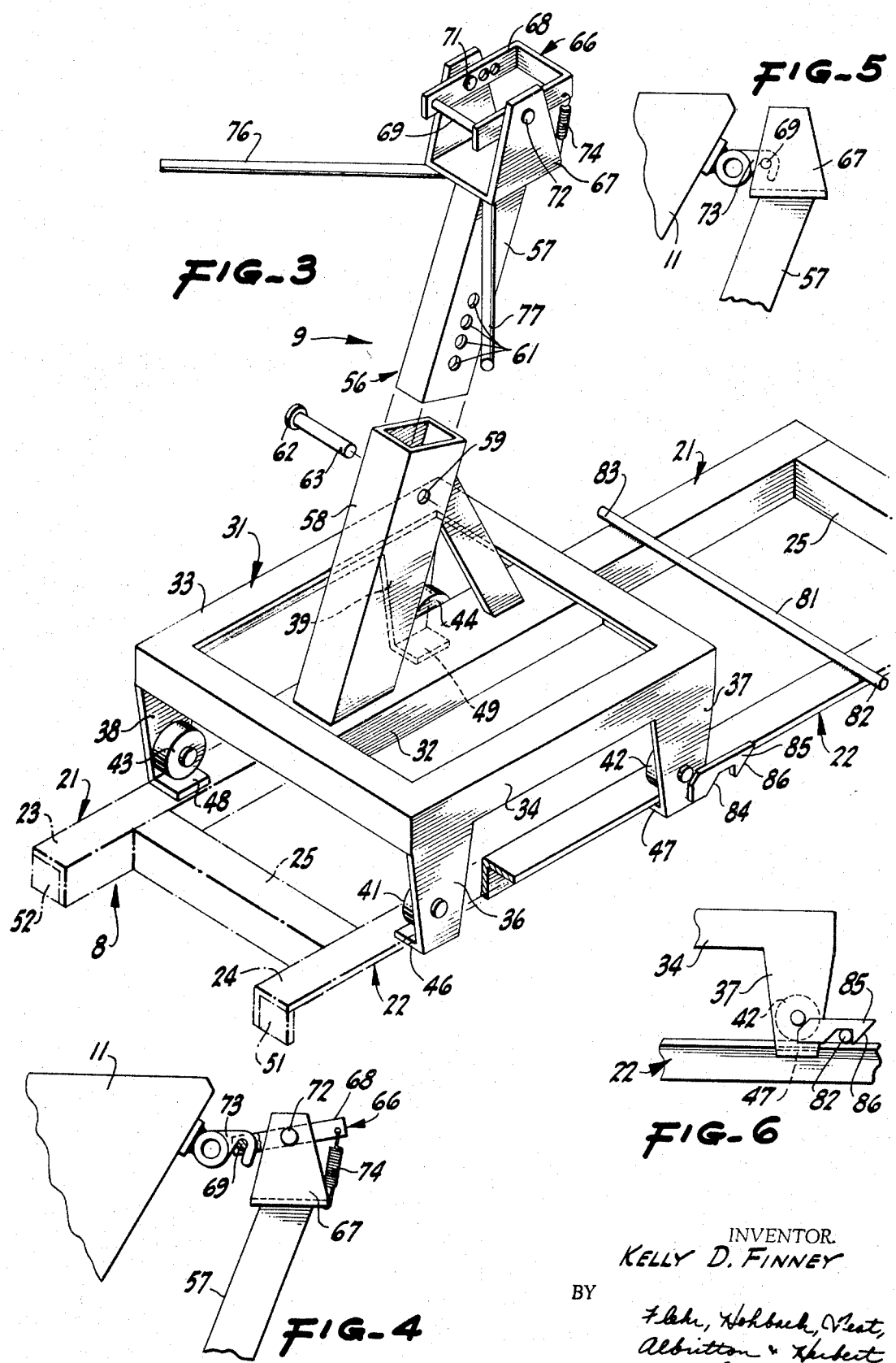

BOAT LOADING AND LAUNCHING TRAILER AND METHOD OF LOADING A BOAT THEREON

BACKGROUND OF THE INVENTION

1. Field of the Invention

This invention relates to the field of trailers for transporting boats relative to a launching and loading site. More particularly, this invention relates to a vehicular trailer for a boat and to a method for loading a boat onto such trailer utilizing the motive power of the boat and without requiring extraneous motive power to effect such loading.

Still more particularly, this invention relates to a boat loading and launching trailer, and to a loading method, which utilizes a movable dolly supported on track structure extending longitudinally of the trailer. The boat to be loaded is interengageable with the dolly on the trailer when the trailer is at least partially immersed in the body of water on which the boat is afloat so that the motive power of the boat may be utilized to drive the dolly and the boat therewith longitudinally of the trailer during loading thereof. Thus, the need of other motive power to effect such loading is obviated.

This invention further relates to a boat trailer which includes latching means for automatically holding a movable dolly thereon in a predetermined position on track structure on the trailer following loading of a boat thereon to prevent backsliding of the boat relative to the trailer following such loading.

2. Description of the Prior Art

A wide variety of boat launching and loading trailers designed to be towed behind a vehicle, such as a truck or automobile, are commercially available. Such known boat trailers include those of the type which are designed to be located at least partly in a body of water so that the boat to be loaded or unloaded therefrom may utilize the buoyancy of the water to assist in such loading or unloading.

However, with prior known and heretofore available boat trailers, separate motive means have been employed to effect loading of the boat onto the trailer. Such motive means commonly takes the form of a manually actuated cable and winch structure mounted adjacent the front end of the trailer which is operatively engageable with an eye member secured to the bow of the boat. By winding the cable on a drum activated by the winch, the boat may be pulled into position on the trailer. Other equivalent motive means also are employed with known boat trailers.

With conventional loading arrangements characteristic of prior art trailers, time consuming and complex loading procedures are commonly encountered.

With the boat trailer and loading method of the present invention, no extraneous motive power is required to effect loading of the boat on the trailer. In that regard, the motive power of the boat itself, such as an inboard or outboard motor carried thereby, is utilized to drive the boat onto the trailer after the bow of the boat has been operatively connected with a movable structure positioned on the trailer, such as a wheeled dolly ridable on track structure supported by the trailer chassis. With the trailer construction and loading method of the present invention, a simplified and rapid loading operation may be effected which obviates the need for conventional loading winches and cables and which eliminates the manual labor and physical strength which is required when a cable and winch loading procedure is utilized.

SUMMARY OF THE INVENTION

This invention relates generally to an improved boat loading and launching trailer. More particularly, this invention relates to a simplified and improved method and procedure for loading a boat on a trailer by utilizing the motive power of the boat to effect such loading. Still more particularly, this invention relates to an improved boat trailer and boat loading method in which a movable dolly, carrying catch structure engageable with a hook member on the bow of the boat, is movable longitudinally of the boat trailer under the urging effects of the motive power of the boat. When the boat has been driven with the movable dolly to a predetermined position on the trailer, latching means interposed between the track structure and the dolly is automatically actuated to preclude backsliding of the trailer on the track structure.

With the boat loading method of the present invention, the cumbersome and time consuming boat loading procedures encountered, when cable and winch loading devices and procedures characteristic or prior art boat trailers are utilized, are obviated.

From the foregoing, it should be understood that this invention relates to: the provision of an improved boat launching and loading trailer; the provision of an improved method for loading a boat on a trailer; the provision of an improved boat loading trailer which includes a movable dolly ridable on track structure provided on the chassis of the trailer; the provision of a movable dolly on a boat loading trailer which includes catch structure and cooperable guide structure to facilitate interengagement of the bow of the boat with the loading dolly during loading thereof on the trailer; the provision on a boat loading trailer of latching structure for positively maintaining a movable dolly in a predetermined position on a track structure following movement of such dolly to such position under the urging of the motive power of the boat itself; and the provision of an improved boat loading procedure which utilizes the motive power of the boat to effect loading which overcomes and rectifies the shortcomings of conventional boat loading trailers and procedures.

These and other objects of this invention will become evident from a study of the following description taken in conjunction with the appended drawings.

BRIEF DESCRIPTION OF THE DRAWINGS

FIG. 3 is an isometric view of the track structure and dolly ridable thereon embodied in the boat trailer of the subject invention.

FIG. 4 is a side elevational view of one embodiment of a catch structure by means of which the bow of the boat is engaged with the trailer dolly.

FIG. 5 is a side elevational view of a modified embodiment of such catch structure.

FIG. 6 is a side elevational view of latching means interposed between the movable dolly on the subject trailer and the track structure on which such dolly rides.

DESCRIPTION OF THE PREFERRED EMBODIMENT

Figure 1:
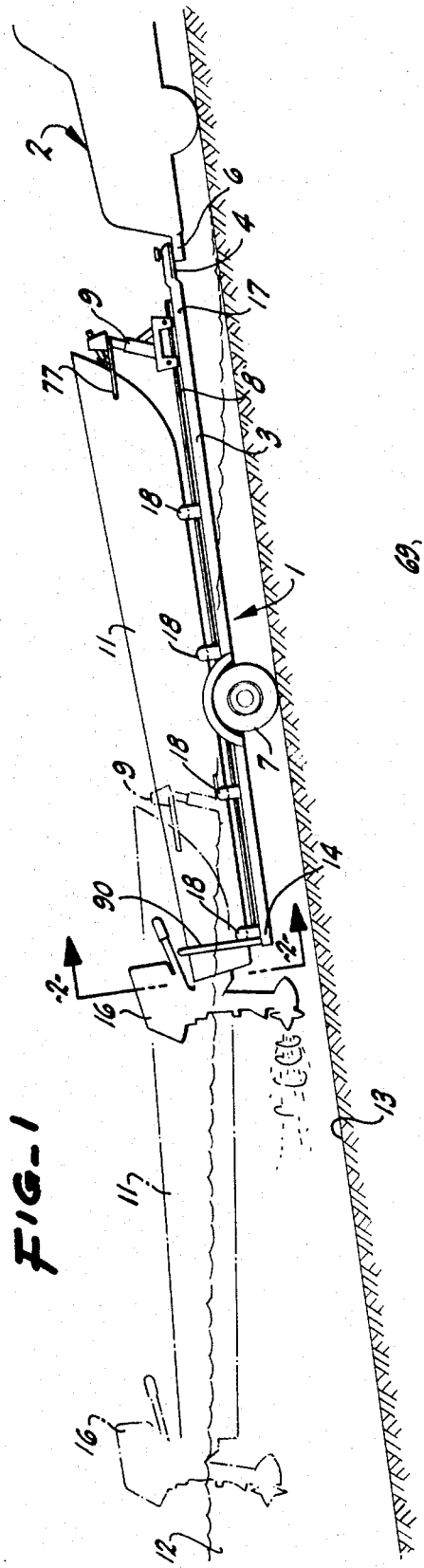
FIG. 1 is a side elevational view of the subject boat loading and launching trailer illustrating in dotted and solid lines a boat loading sequence.

Reference is first directed to FIG. 1 for a general description of the boat loading and launching trailer of this invention and the procedure utilized for loading a boat thereon. In that regard, the subject trailer, generally designated 1, is towed to a boat launching site by any suitable vehicle designated 2, which may be in the form of a truck or automobile. The trailer includes a chassis, generally designated 3, of any suitable box frame or like construction. At the front end of the chassis and secured thereto in known fashion is a conventional trailer hitch structure 4 releasably interengaged with the bumpber 6 of the towing vehicle in known fashion.

The trailer chassis 3 is supported by two or more wheel and tire assemblies, each of which is generally designated 7, in known fashion. The chassis of the trailer is defined by a series of longitudinal and transverse metal frame members secured together by welding or other conventional means in known fashion into a rigid chassis framework.

Extending longitudinally of the chassis is track structure 8 which extends from one end of the trailer to the other. Ridable on and supported by the track structure is structure defined by a movable dolly, generally designated 9, with which the boat to be transported by the trailer is operatively engageable as will be described.

As illustrated by the solid and dotted line showings of FIG. 1, the dolly 9 is movable longitudinally of the trailer chassis along track structure 8 between the opposite front and rear ends of the trailer. Means is provided on the trailer dolly for securing the boat to the dolly in the manner to be described. Such means facilitates loading of the boat onto the trailer solely under the motive power of the boat so that the use of conventional cable and winch loading devices, or equivalent devices, is obviated during loading.

The boat loading procedure utilizing the trailer of the subject invention will be briefly described, still referring to FIG. 1.

When the boat, generally designated 11, to be loaded is afloat in a body of water 12, loading thereof on the trailer for transportation from the loading site may be readily effected. In that regard, it is common at boath launching and loading sites to find an inclined concrete or like ramp 13 extending into the water which permits boat trailers to be backed into the water by the vehicles which tow the same so that at least a substantial portion of the trailer is immersed in the water. With the subject invention, the vehicle 2 is utilized to back trailer 1 into the water so that a substantial portion of the rear end 14 of the trailer is immersed. When thus immersed, boat 11 is driven under its own motive power, such as an outboard motor 16 illustrated, to a location adjacent the rear end 14 of the trailer. When thus located, the bow of the boat may be automatically interengaged with the dolly 9 on the trailer which has been positioned adjacent the rear end of the trailer generally in the dotted line position shown in FIG. 1. Such positioning is effected automatically, due to the effects of gravity which causes the dolly to travel downwardly along the inclined track structure, when the dolly is disengaged from latching structure provided adjacent the front end 17 of the trailer, as will be described. When the boat and dolly are interengaged, the motive power of the boat is utilized to drive the boat longitudinally of the trailer and to push the dolly along the track structure 8 towards the front end 17 of the trailer.

By properly positioning the trailer in the body of water, the motive power of the boat may be utilized to drive the boat the full length of the trailer until the boat is properly positioned thereon for transportation therewith. In that regard, as will be described hereinafter, latching means is provided between the dolly 9 and the trailer track structure 8 which automatically locks the dolly in the forward position adjacent the front end 17 of the trailer as seen by the solid lines in FIG. 1.

To assist in supporting the hull of the boat during movement thereof longitudinally of the trailer, roller means, generally designated 18, are provided at spaced locations along the chassis of the trailer in known fashion.

Figure 2:
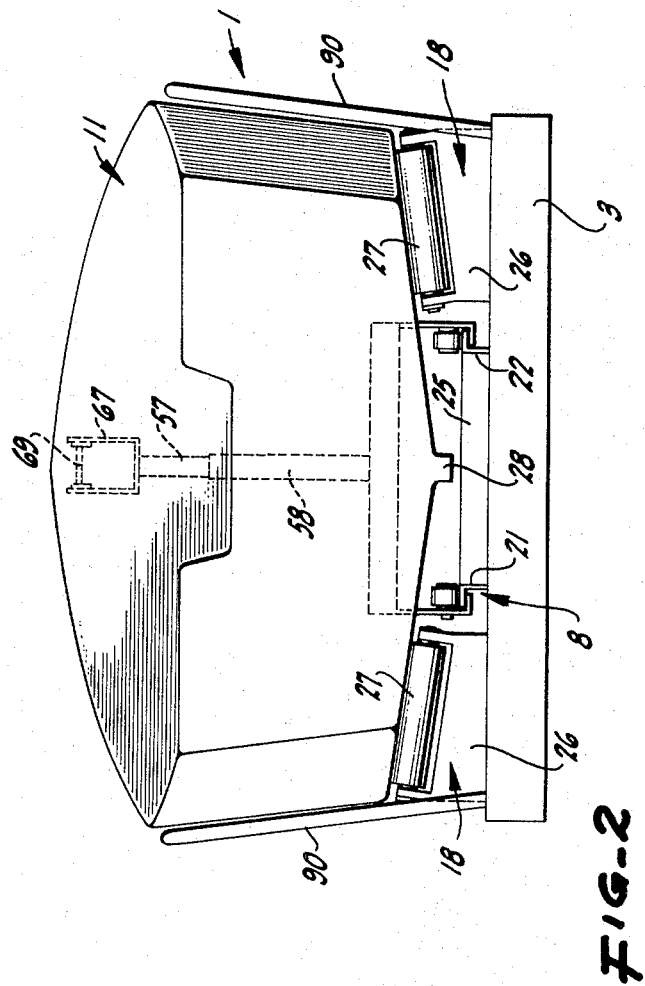
FIG. 2 is a rear elevational view, on an enlarged scale relative to FIG. 1, of the subject trailer with a boat positioned thereon.

Referring now to FIGS. 2 and 3, details of construction of the improved trailer of this invention will be described. In that regard, as noted previously, the chassis 3 of the trailer on which the boat 11 is supported includes track structure 8 extending longitudinally thereof. In the embodiment illustrated, such track structure comprises a pair of parallel inverted laterally spaced L-shaped track members 21 and 22 each of which is secured to the chassis framework in any suitable fashion, such as by welding. Each of the track members includes a generally outwardly directed planar flange, designated 23 and 24 respectively, upon the surface of which the dolly 9 is ridable. Brace members 25 extend between, are welded to, and interconnect the track members as seen in FIG. 3.

Provided in conjunction with the track structure and supported by the chassis 3 in any suitable fashion, such as by welding, is the aforementioned roller means 18. Such roller means includes a plurality of supporting brackets 26 positioned at spaced locations along opposite sides of the trailer, each having a conventional roller member 27 rotatably mounted thereon in known fashion. The rollers 27 are downwardly and inwardly inclined towards the longitudinal axis of the trailer as seen in FIG. 2 so that the same together conform generally to the tapered contour of the bottom of the hull of the boat 11 to be supported thereon. Thus, the keel 28 of the boat is supported by the rollers 27 between the track members 21 and 22 and above the chassis of the trailer.

As best seen in FIG. 3, dolly 9 includes an open framework, generally designated 31, which is defined by four sections of L-shaped angle iron or the like secured together into a unitary assembly by welding or other suitable means. Extending longitudinally of the framework generally in alignment with the axis of the trailer is a mounting plate 32 secured to the framework by welding or other suitable means. Projecting downwardly from each of the side frame members 33 and 34 at the corners of the framework are pairs of longitudinally spaced wheel mounting flanges designated 36, 37, 38 and 39 respectively. Such mounting flanges support wheel assemblies 41, 42, 43 and 44 respectively, by means of which the dolly is movably supported on the rail structure. The wheel assemblies may take any conventional construction and preferably the wheels thereof are formed from a material which is resistant to the corrosive effects of salt or fresh water to which the dolly is subjected during loading and launching of a boat relative to the trailer. In that regard, plastic wheels of nylon or equivalent material may be utilized. Such wheel assemblies are rotatably mounted on axles secured to the respective mounting flanges 36, 37, 38, and 39 in conventional fashion.

Spaced vertically from and underlying the respective wheel assemblies and forming bent continuations of the mounting flanges described are flange extensions designated 46, 47, 48 and 49. Such flange member extensions underlie the planar flanges 23 and 24 of the respective track members 21 and 23 and positively preclude vertical upward movement of the dolly relative to the track structure.

It will be apparent that the lateral spacing of the mounting flanges at opposite sides of the dolly is such that the dolly may straddle the track structure in the fashion best seen in FIG. 3. In that regard, to preclude movement of the dolly from the track structure beyond the rear end 14 of the trailer, stop means is provided adjacent such rear end. Such stop means may take various forms and in the embodiment illustrated comprises stop plates 51 and 52 respectively depending from the respective track members. Such stop plates are engageable by the rear flange member extensions 46 and 48 of the dolly and preclude separation of the dolly in the longitudinal direction from the track structure.

Projecting upwardly from the mounting plate 32 of the dolly is a generally upright post structure, generally designated 56, which is defined by two adjustable hollow post sections 57 and 58, the latter of which is secured to the frame member 32 in any suitable fashion, such as by welding. The upper post section 57 is telescopically received within the lower post section 58 and the two post sections are correspondingly contoured, preferably of rectangular cross section, so that a smooth non-rotatable slidable interfit is provided therebetween.

A transverse opening 59 is provided through the lower post section 58 and a series of transverse openings 61 are spacedly provided through the upper post section 57. Upon alignment of a predetermined one of the opening 61 in the upper post section with the opening 59 in the lower post section, means for positively retaining the post sections against movement relative to each other may be passed through the aligned openings. Such means in the embodiment illustrated comprises a headed retaining pin 62 having a bore 63 through one end thereof adapted to receive a cotter pin (not shown) therethrough to preclude separation of the retaining pin from the interengaged post sections when the post sections have been secured in a predetermined position of adjustment.

By selectively positioning the upper post section relative to the lower post section, the dolly may be adapted to accommodate and interfit with a boat of predetermined size. Thus the subject trailer is adaptable to carry boats of various sizes.

Provided adjacent the top of the post structure is catch structure, generally designated 66, by means of which the boat may be operatively engaged with the dolly. Such catch structure in the embodiment illustrated comprises a U-shaped bracket 67 welded or otherwise secured to the top of upper post section 57. Mounted between the opposed arms of bracket 67 is a U-shaped yoke member 68 having a pin 69 extending transversely thereof and welded or otherwise secured thereto. The yoke 68 is pivotally mounted by a pair of pivot pins 71 and 72 between the opposed arms of bracket 67 as seen in FIG. 3. A plurality of holes are provided in the arms of yoke 68 so that the pivot pins may be engaged with the yoke in a plurality of positions as required to permit engagement of a particular boat therewith.

The transverse rod 69 of the catch structure 66 is provided to permit automatic interengagement of the bow of the boat with the catch structure. In that regard, as seen in FIG. 4, the boat is provided at its bow with a specially designed hook member 73 the purpose of which is to connect the boat with the transverse rod 69 of the catch structure. Such improved hook member includes an integral eye structure therewith which permits a boat to receive a rope or other tying member therethrough. The hook member shown is designed to replace the conventional eye commonly found on boats. Connection of the boat with the hook member 73 may be effected automatically when the boat is positioned in the dotted line position of FIG. 1.

The catch structure is designed so that interengagement between the boat bow and the catch structure may be effected without manual handling. In that regard, with the embodiment of the catch structure shown in FIGS. 3 and 4, means is provided for urging rod 69 to a position in which it may automatically be engaged by the hook member 73 on the bow of the boat. Such urging means comprises a coil spring 74 interposed between yoke member 68 and the mounting bracket 67. Thus the tension of spring 74 pivotally urges yoke 68 in a clockwise direction as seen in FIG. 4 so that the transverse rod 69 is held in a position in which it may be engaged by the hook member on the bow of the boat.

Such automatic engagement may be effected by driving the boat under its own motive power against the dolly. By properly positioning the trailer in the water so that the dolly is substantially submerged, the transverse rod 69 initially is positioned below the level of the hook member 73 on the bow of the boat. Thus, when the bow of the boat engages the dolly, the dolly is driven upwardly along the inclined track structure until the transverse rod 69 carried by the dolly rises into engagement with the hook member 73. Thereafter, interengagement of the rod and hook member is maintained as the boat is driven along the track structure and pushes the dolly along in front. Spring 74 attached to yoke member 68 provides any resilience required to prevent damage to the boat or dolly during such interengagement between the hook member and transverse rod as just described. When the hook member and rod are interengaged as seen in FIG. 4, separation of the boat relative to dolly 9 is positively precluded by the interengagement shown.

As an alternative arrangement, referring to FIG. 5, the transverse rod 69 may be secured directly between and welded or otherwise connected directly to the opposite arms of the mounting bracket 67. With that arrangement, hook member 73 on the bow of the boat may be automatically engaged with the transverse rod 69 by utilizing the motive power of the boat to drive the boat against the dolly in the manner just described with respect to the embodiment shown in FIG. 4.

In either case, once the hook member on the boat and the catch structure of the dolly are interengaged, separation thereof is positively precluded until such separation is desired during launching or unloading of the boat from the trailer.

To facilitate automatic interengagement of the hook member on the bow of the boat with the catch structure on the dolly as just described, guide structure is provided on the boat trailer. Preferably such guide structure is provided closely adjacent the catch structure to insure such automatic interengagement. As seen in FIG. 3, such guide structure comprises a pair of rigid metal guide rods 76 and 77 respectively which extend generally horizontally at right angles relative to each other and at approximately 45° relative to the axis of the trailer. The angular relationship between the guide rods is dictated by the contour of the bow of the boat to be engaged therewith. Such guide rods are rigidly secured to the post structure 56 and to the underside of the mounting bracket 67 in any suitable fashion, such as by welding. Although not shown in FIG. 3, the guide rods preferably are covered with a suitable cushioning material of cloth or plastic or the like to preclude damage to the bow of the boat when the same comes in contact with such guide rods during boat loading or unloading and transporting.

The function of the guide rods is to guide the bow of the boat into position adjacent the catch structure on the dolly so that hook member 73 on the boat may be automatically engaged with the transverse rod 69 of the catch structure in the manner described previously. The boat trailer guide structure also preferably includes other guide means adjacent the rear end of the trailer to further assist in properly positioning the boat thereon. Such other guide means includes two generally upright guide rods 90 secured to the chassis by welding or the like. Such guide rods 90 diverge upwardly and outwardly somewhat as seen in FIG. 2 in conformity to the contour of the boat hull. Such guide rods also are covered with a suitable cushioning material to preclude damage to the boat during loading or unloading and transporting.

When the catch structure of the dolly and the boat are interengaged, by utilizing the motive power of the boat, and without requiring any extraneous motive power, the boat may be driven longitudinally of the trailer, pushing the dolly therewith, between the dotted line position to the solid line position shown in FIG. 1. During such movement, the dolly rides along the track structure and the boat hull rides on the roller means previously described. When in the latter position, the dolly is automatically precluded from backsliding by latching means interposed between the track structure and the dolly.

Such latching means in the embodiment illustrated comprises cooperable latching members secured to the dolly and to the track structure. In that regard, such latching structure comprises a latching member defined by a detent rod 81 which extends transversely of the track members 21 and 22, which is secured thereto by welding or the like, and which has its opposite ends 82 and 83 projecting beyond the lateral margins of the tracks as best seen in FIG. 3. Provided on the dolly adjacent the lower outer corners of the mounting flanges 37 and 39 at the front end of the dolly are a pair of latching members, only one of which is shown in FIG. 3, designated 85. Each such dolly latching member is defined by a flat latch plate which includes recess 84 intermediate its ends, one of which is defined by a tapered leading edge 86.

When the dolly is urged longitudinally on the track structure by the motive power of the boat, the leading edge 86 of each latch 85 runs against the cooperable projecting end of the detent rod 81. When the movement of the boat is continued, the latches 85 ride over the rod ends until the recessed portions thereof are in a position to move downwardly into engagement with the respective detent rod ends. When thus interengaged, as seen in FIG. 6, backsliding of the dolly relative to the latching rod 81 is positively precluded and the boat is maintained positively by the dolly on the trailer chassis in the forward solid line position shown in FIG. 1. Thus, boat loading may be easily and readily effected utilizing the boat's arm motive power.

For transportation, it may be desired to pass straps or cables or other hold down means (not shown) around the boat and the trailer chassis to possitively preclude separation of the boat from the trailer if transportation thereof over rough terrain is expected. However, such additional hold down means is not essential under all transportation conditions but may be utilized in the discretion of the boat user.

To launch the boat from the trailer, it is merely necessary to position the trailer in the partially immersed solid line position shown in FIG. 1. Thereafter, by manually raising the front end of the dolly to disengage the latching members of the latching means, the boat may be allowed to slide with the dolly under the effects of gravity downwardly on the track structure. When the boat is afloat, the hook member at the bow of the boat will become automatically disengaged from the catch structure on the dolly. Such disengagement is effected without manual handling as the dolly moves downwardly to the end of the inclined track structure under the effects of gravity as the boat is increasingly buoyed up by the water. Following separation of the boat and dolly, the trailer may be towed from the water by the towing vehicle and the boat may be utilized for its intended purpose.

Having thus made a full disclosure of the improved boat trailer and simplified loading method of this invention, reference is directed to the appended claims for the scope of protection to be afforded thereto.

I claim:

1. A boat trailer designed to permit loading of a boat thereon directly from the water utilizing only the motive power of said boat to effect such loading, said trailer comprising A. a wheeled chassis which is positionable at least partially in a body of water during loading of a boat on said trailer,
   B. track structure on said chassis extending longitudinally thereof, comprising
      1. a pair of laterally spaced track members secured to said chassis,
      2. each of said track members including an elongated flange extending therealong,
      3. at least one end of said track structure being immersible in such body of water when said chassis is positioned therein for loading a boat on said trailer,
   C. a dolly operatively supported on said track structure and movable longitudinally thereof to be at least partially immersed in such body of water during boat loading, comprising
      1. a framework overlying and generally straddling said spaced track members, 2. mounting flanges adjacent corners of said framework,
3. wheel assemblies secured to said mounting flanges including wheels rideable on said track members during movement of said dolly along said track structure,
4. flange extensions provided in conjunction with said mounting flanges underlying said elongated track member flanges to preclude lateral and vertical separation of said dolly from said track structure,
5. a generally upright post supported by said framework and extending thereabove,
6. catch structure surmounting said post to be automatically engaged by a hook member provided on the bow of a boat during loading of such boat on said trailer, and
7. guide structure adjacent said catch structure for guiding the bow of such boat into position relative to said dolly and for positioning said hook member on said boat bow for contact with said catch structure, said guide structure comprising
   a. a pair of angularly related rigid arm structures projecting outwardly from said post, and
D. automatically operable latching means for maintaining said dolly in a predetermined location adjacent the other end of said track structure to preclude back sliding thereof following movement of said boat and said dolly therewith along said track structure under the motive power of said boat following engagement of said boat with said dolly, said latching means comprising
   1. releasably interengagable latching members provided on said dolly and on said track structure.

2. The boat trailer of claim 1 in which said latching member on said dolly comprises a recessed latch, and in which said latching member on said track structure comprises a detent projecting from said track structure into the path of movement of said dolly with which said dolly latch is engageable when said dolly is moved to said predetermined location.

3. The boat trailer of claim 1 in which track structure further includes
4. stop means adjacent said other end of at least one of said track members for precluding movement of said dolly past a predetermined point when said dolly is positioned in said water to receive a boat for loading.

4. The boat trailer of claim 1 in which said post is defined by
   a. two sections vertically adjustable relative to each other so that said catch structure may be vertically positioned selectively to adapt the same to receive a boat of predetermined size, and
   b. means for positively retaining said post sections in a predetermined position of adjustment.

5. The boat trailer of claim 4 in which said two post sections are telescopically interfitted one within the other.

6. The boat trailer of claim 1 in which said catch structure includes
   a. a transverse rod adjacent the top of said post over which said hook member on said boat bow is engageable.

7. The boat trailer of claim 6 in which said catch structure further includes
   b. a pivotal yoke mounted atop said post with said rod extending transversely thereof, and
   c. spring means for normally urging said yoke and said rod therewith in one direction and permitting pivotal movement of said yoke and said rod therewith in the opposite direction.

8. The boat trailer of claim 1 in which said latching means comprises
   1. a latching member on said dolly which is movable therewith, and
   2. a cooperable latching member positioned in the path of movement of said dolly on said track structure adjacent said other end thereof with which said dolly latching member is automatically engageable when said dolly reaches such other end.

9. The boat trailer of claim 1 which further includes
E. guide roller means supported by said chassis in conjunction with said track structure over which said boat may ride during movement of said dolly from said one end of said track structure toward said other end thereof during loading of said boat.

* * * * *